United States Patent
Jiang et al.

(10) Patent No.: US 9,247,545 B2
(45) Date of Patent: Jan. 26, 2016

(54) METHOD AND DEVICE FOR MAPPING SPATIAL STREAM TO SPACE TIME STREAM, AND METHOD AND DEVICE FOR TRANSMITTING DATA

(75) Inventors: Anming Jiang, Shenzhen (CN); Jing Jiang, Shenzhen (CN); Kaibo Tian, Shenzhen (CN); Nan Li, Shenzhen (CN)

(73) Assignee: ZTE Corporation (CN)

( * ) Notice: Subject to any disclaimer, the term of this patent is extended or adjusted under 35 U.S.C. 154(b) by 170 days.

(21) Appl. No.: 13/979,520

(22) PCT Filed: Jun. 28, 2011

(86) PCT No.: PCT/CN2011/076530
§ 371 (c)(1),
(2), (4) Date: Jul. 12, 2013

(87) PCT Pub. No.: WO2012/094877
PCT Pub. Date: Jul. 19, 2012

(65) Prior Publication Data
US 2013/0294534 A1   Nov. 7, 2013

(30) Foreign Application Priority Data
Jan. 14, 2011   (CN) .......................... 2011 1 0007980

(51) Int. Cl.
*H04W 72/04*   (2009.01)
*H04B 7/06*   (2006.01)
(Continued)

(52) U.S. Cl.
CPC ........... *H04W 72/046* (2013.01); *H04B 7/0669* (2013.01); *H04L 1/0625* (2013.01); *H04L 5/0023* (2013.01)

(58) Field of Classification Search
CPC .. H04B 7/0669; H04L 5/0023; H04L 5/0025; H04L 1/0618; H04L 1/0612; H04W 72/046
See application file for complete search history.

(56) References Cited

U.S. PATENT DOCUMENTS

2007/0211822 A1*   9/2007   Olesen et al. ................. 375/299
2009/0232252 A1*   9/2009   Kim et al. ..................... 375/298
(Continued)

FOREIGN PATENT DOCUMENTS

| CN | 1841962 A | 10/2006 |
| CN | 101056132 A | 10/2007 |
| WO | 2009157734 A2 | 12/2009 |

OTHER PUBLICATIONS

IEEE P802.11n™/D4.00, Draft STANDARD for Information Technology—Telecommunications and information exchange between systems—Local and metropolitan area networks—Specific requirements—Part 11: Wireless LAN Medium Access Control(MAC) and Physical Layer (PHY) specifications: Amendment 4: Enhancements for HigherThroughput, Mar. 2008.*

(Continued)

*Primary Examiner* — Aristocratis Fotakis
(74) *Attorney, Agent, or Firm* — Banner & Witcoff, Ltd.

(57) ABSTRACT

A method and device for mapping a spatial stream to a space-time stream, and a method and device for transmitting data are provided in the disclosure. The mapping method includes: determining, according to a space-time encoding indication bit in a network, whether to adopt space-time encoding (S102); if it is determined to adopt space-time encoding, mapping M OFDM symbols carried by the nth spatial stream to OFDM symbols carried by the (2n−1)th and 2nth space-time stream respectively, n=1, 2, . . . , N, N is the total number of spatial streams in the network, M is the number of OFDM symbols carried by each spatial stream, and M is an even greater than zero (S104). Applying the disclosure, the problem that there is no specific method for mapping spatial stream to space-time stream using space-time encoding in a typical 802.11ac ultrahigh throughput WLAN system can be solved.

6 Claims, 4 Drawing Sheets

Determine, according to a space-time coding indication bit in a network, whether to adopt space-time coding — S102

If it is determined to adopt the space-time coding, respectively map M OFDM symbols carried by the nth spatial stream to the OFDM symbols carried by the (2n - 1)th space-time stream and the OFDM symbols carried by the 2nth space-time stream, where n = 1, 2, ..., N, N is the total number of spatial streams in the network, M is the number of OFDM symbols carried by each spatial stream, and M is an even greater than zero — S104

(51) Int. Cl.
*H04L 1/06* (2006.01)
*H04L 5/00* (2006.01)

(56) References Cited

U.S. PATENT DOCUMENTS

2010/0226415 A1* 9/2010 Mehta et al. .................. 375/219
2011/0026639 A1* 2/2011 Rouquette-Leveil et al. 375/298

OTHER PUBLICATIONS

IEEE 802.11-11/0032r0, "STBC with multiple spatial streams", Jan. 17, 2011.*
IEEE 802.11-09/0992r21, IEEE P802.11, Specification Framework for TGac, Jan. 19, 2011.*

* cited by examiner

US 9,247,545 B2

METHOD AND DEVICE FOR MAPPING SPATIAL STREAM TO SPACE TIME STREAM, AND METHOD AND DEVICE FOR TRANSMITTING DATA

TECHNICAL FIELD

The disclosure relates to the field of communications, and in particular to a method and a device for mapping a spatial stream to a space-time stream, and a method and a device for transmitting data.

BACKGROUND

Wireless local area network (WLAN) is a network architecture which can realize intercommunication and resource sharing by interconnecting computer devices using wireless communication technologies. IEEE802.11 is one of mainstream technologies of the current wireless local area network, which protocol mainly specifies specifications of the physical layer (PHY) and the media access control (MAC) layer.

WLAN has undergone a development course from 802.11 to 802.11b and to 802.11a/g and then to 802.11n and finally to 802.11ac. With the increase of the demand of the user to wireless networks, the requirements for the information capacity of the wireless communication system are continuously increasing.

For a typical 802.11 ac ultrahigh throughput WLAN system, up to 8 streams can be supported for data transmission. If it is desired to improve the performance, space-time encoding can be adopted by setting a space-time encoding indication bit in the system, and at this moment, an even of space-time streams (i.e. the number of the space-time streams is 2, 4, 6 or 8) can be applied to perform data transmission. However, for the typical 802.11 ac ultrahigh throughput WLAN system, there is still no specific method for mapping a spatial stream to a space-time stream adopting space-time encoding currently. Therefore, how to map a spatial stream to a space-time stream adopting space-time encoding in a typical ultrahigh throughput WLAN system is a problem urgent to be solved.

For the problem in the related art that there is still no specific method for mapping a spatial stream to a space-time stream adopting space-time encoding for a typical 802.11 ac ultrahigh throughput WLAN system, there is still no effective solution being proposed.

SUMMARY

The disclosure provides a method and a device for mapping a spatial stream to a space-time stream, and a method and a device for transmitting data, so as to solve the problem in the related art that there is still no specific method for mapping a spatial stream to a space-time stream adopting space-time encoding for a typical 802.11 ac ultrahigh throughput WLAN system.

According to one aspect of the disclosure, a method for mapping a spatial stream to a space-time stream is provided, including: determining, according to a space-time encoding indication bit in a network, whether to adopt space-time encoding; and if it is determined to adopt the space-time encoding, mapping M orthogonal frequency division multiplexing (OFDM) symbols carried by the nth spatial stream to OFDM symbols carried by the (2n−1)th space-time stream and OFDM symbols carried by the 2 nth space-time stream respectively, wherein n=1, 2, . . . , N, N is the total number of spatial streams in the network, M is the number of OFDM symbols carried by each spatial stream, and M is an even greater than zero.

Mapping the OFDM symbols carried by the nth spatial stream to the OFDM symbols carried by the (2n−1)th space-time stream includes: mapping the M OFDM symbols carried by the nth spatial stream, according to an arrangement order of the M OFDM symbols in the nth spatial stream, to M OFDM symbols of the (2n−1)th space-time stream successively.

Mapping the OFDM symbols carried by the nth spatial stream to the OFDM symbols carried by the 2 nth space-time stream includes: mapping the opposite number of the conjugation of the 2mth OFDM symbol carried by the nth spatial stream to the (2m−1)th OFDM symbol of the 2 nth space-time stream; and mapping the conjugation of the (2m−1)th OFDM symbol carried by the nth spatial stream to the 2mth OFDM symbol of the 2 nth space-time stream, wherein m=1, 2, . . . , M/2.

When the number of the spatial streams in the network is 3, M OFDM symbols carried by each of the 3 spatial streams are respectively mapped to 6 space-time streams.

When the number N of the spatial streams in the network is 3, respectively mapping the M OFDM symbols carried by each of the 3 spatial streams to 6 space-time streams includes: mapping M OFDM symbols carried by the 1st spatial stream, according to an original order of the OFDM symbols, to M OFDM symbols of the 1st space-time stream successively; mapping the opposite number of the conjugation of the 2nd OFDM symbol carried by the 1st spatial stream to the 1st OFDM symbol of the 2nd space-time stream, mapping the conjugation of the 1st OFDM symbol carried by the 1st spatial stream to the 2nd OFDM symbol of the 2nd space-time stream, mapping the opposite number of the conjugation of the 4th OFDM symbol carried by the 1st spatial stream to the 3rd OFDM symbol of the 2nd space-time stream, mapping the conjugation of the 3rd OFDM symbol carried by the 1st spatial stream to the 4th OFDM symbol of the 2nd space-time stream, and according to a two-by-two crossover operation method for M OFDM symbols of the 1st spatial stream, mapping the opposite number of the conjugation of the Mth OFDM symbol carried by the 1st spatial stream to the (M−1)th OFDM symbol of the 2nd space-time stream and mapping the conjugation of the (M−1)th OFDM symbol carried by the 1st spatial stream to the Mth OFDM symbol of the 2nd space-time stream, to obtain the 2nd space-time stream; mapping M OFDM symbols carried by the 2nd spatial stream, according to an original order of the OFDM symbols, to M OFDM symbols of the 3rd space-time stream successively; mapping the opposite number of the conjugation of the 2nd OFDM symbol carried by the 2nd spatial stream to the 1st OFDM symbol of the 4th space-time stream, mapping the conjugation of the 1st OFDM symbol carried by the 2nd spatial stream to the 2nd OFDM symbol of the 4th space-time stream, mapping the opposite number of the conjugation of the 4th OFDM symbol carried by the 2nd spatial stream to the 3rd OFDM symbol of the 4th space-time stream, mapping the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, mapping the opposite number of the conjugation of the Mth OFDM symbol carried by the 2nd spatial stream to the (M−1)th OFDM symbol of the 4th space-time stream and mapping the conjugation of the (M−1)th OFDM symbol carried by the 2nd spatial stream to the Mth OFDM symbol of the 4th space-time stream, to obtain the 4th space-time stream; mapping M OFDM symbols carried by the 3rd spatial stream, according to an original order of the OFDM symbols, to M OFDM symbols of the 5th space-time stream successively; and mapping the opposite number of the conjugation of the 2nd OFDM symbol carried by the 3rd spatial stream to the 1st OFDM symbol of the 6th space-time stream, mapping the conjugation of the 1st OFDM symbol carried by the 3rd spatial stream to the 2nd OFDM symbol of the 6th space-time stream, mapping the opposite number of the conjugation of the 4th OFDM symbol carried by the 3rd spatial stream to the 3rd OFDM symbol of the 6th space-time stream, mapping the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, mapping the opposite number of the conjugation of the Mth OFDM symbol carried by the 3rd spatial stream to the (M−1)th OFDM symbol of the 6th space-time stream and mapping the conjugation of the (M−1)th OFDM symbol carried by the 3rd spatial stream to the Mth OFDM symbol of the 6th space-time stream, to obtain the 6th space-time stream.

When the number of the spatial streams in the network is 4, M OFDM symbols carried by each of the 4 spatial streams are respectively mapped to 8 space-time streams.

When the number N of the spatial streams in the network is 4, respectively mapping the M OFDM symbols carried by each of the 4 spatial streams to 8 space-time streams includes: mapping M OFDM symbols carried by the 1st spatial stream, according to an original order of the OFDM symbols, to M OFDM symbols of the 1st space-time stream successively; mapping the opposite number of the conjugation of the 2nd OFDM symbol carried by the 1st spatial stream to the 1st OFDM symbol of the 2nd space-time stream, mapping the conjugation of the 1st OFDM symbol carried by the 1st spatial stream to the 2nd OFDM symbol of the 2nd space-time stream, mapping the opposite number of the conjugation of the 4th OFDM symbol carried by the 1st spatial stream to the 3rd OFDM symbol of the 2nd space-time stream, mapping the conjugation of the 3rd OFDM symbol carried by the 1st spatial stream to the 4th OFDM symbol of the 2nd space-time stream, and according to a two-by-two crossover operation method for M OFDM symbols of the 1st spatial stream, mapping the opposite number of the conjugation of the Mth OFDM symbol carried by the 1st spatial stream to the (M−1)th OFDM symbol of the 2nd space-time stream and mapping the conjugation of the (M−1)th OFDM symbol carried by the 1st spatial stream to the Mth OFDM symbol of the 2nd space-time stream, to obtain the 2nd space-time stream; mapping M OFDM symbols carried by the 2nd spatial stream, according to an original order of the OFDM symbols, to M OFDM symbols of the 3rd space-time stream successively; mapping the opposite number of the conjugation of the 2nd OFDM symbol carried by the 2nd spatial stream to the 1st OFDM symbol of the 4th space-time stream, mapping the conjugation of the 1st OFDM symbol carried by the 2nd spatial stream to the 2nd OFDM symbol of the 4th space-time stream, mapping the opposite number of the conjugation of the 4th OFDM symbol carried by the 2nd spatial stream to the 3rd OFDM symbol of the 4th space-time stream, mapping the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, mapping the opposite number of the conjugation of the Mth OFDM symbol carried by the 2nd spatial stream to the (M−1)th OFDM symbol of the 4th space-time stream and mapping the conjugation of the (M−1)th OFDM symbol carried by the 2nd spatial stream to the Mth OFDM symbol of the 4th space-time stream, to obtain the 4th space-time stream; mapping M OFDM symbols carried by the 3rd spatial stream, according to an original order of the OFDM symbols, to M OFDM symbols of the 5th space-time stream successively; mapping the opposite number of the conjugation of the 2nd OFDM symbol carried by the 3rd spatial stream to the 1st OFDM symbol of the 6th space-time stream, mapping the conjugation of the 1st OFDM symbol carried by the 3rd spatial stream to the 2nd OFDM symbol of the 6th space-time stream, mapping the opposite number of the conjugation of the 4th OFDM symbol carried by the 3rd spatial stream to the 3rd OFDM symbol of the 6th space-time stream, mapping the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, mapping the opposite number of the conjugation of the Mth OFDM symbol carried by the 3rd spatial stream to the (M−1)th OFDM symbol of the 6th space-time stream and mapping the conjugation of the (M−1)th OFDM symbol carried by the 3rd spatial stream to the Mth OFDM symbol of the 6th space-time stream, to obtain the 6th space-time stream; mapping M OFDM symbols carried by the 4th spatial stream, according to an original order of the OFDM symbols, to M OFDM symbols of the 7th space-time stream successively; and mapping the opposite number of the conjugation of the 2nd OFDM symbol carried by the 4th spatial stream to the 1st OFDM symbol of the 8th space-time stream, mapping the conjugation of the 1st OFDM symbol carried by the 4th spatial stream to the 2nd OFDM symbol of the 8th space-time stream, mapping the opposite number of the conjugation of the 4th OFDM symbol carried by the 4th spatial stream to the 3rd OFDM symbol of the 8th space-time stream, mapping the conjugation of the 3rd OFDM symbol carried by the 4th spatial stream to the 4th OFDM symbol of the 8th space-time stream, and according to a two-by-two crossover operation method for M OFDM symbols of the 4th spatial stream, mapping the opposite number of the conjugation of the Mth OFDM symbol carried by the 4th spatial stream to the (M−1)th OFDM symbol of the 8th space-time stream and mapping the conjugation of the (M−1)th OFDM symbol carried by the 4th spatial stream to the Mth OFDM symbol of the 8th space-time stream, to obtain the 8th space-time stream.

After determining whether to adopt the space-time encoding according to the space-time encoding indication bit in the network, the method further includes: if it is determined not to adopt the space-time encoding, then mapping the M OFDM symbols carried by the nth spatial stream, according to an arrangement order of the M OFDM symbols in the nth spatial stream, to M OFDM symbols carried by the nth space-time stream successively.

According to another aspect of the disclosure, a method for transmitting data is provided, including: determining, according to a space-time encoding indication bit in a network, whether to adopt space-time encoding; if it is determined to adopt the space-time encoding, mapping M orthogonal frequency division multiplexing (OFDM) symbols carried by the nth spatial stream to OFDM symbols carried by the (2n−1)th space-time stream and OFDM symbols carried by the 2 nth space-time stream respectively, wherein n=1, 2, . . . , N, N is the total number of spatial streams in the network, M is the number of OFDM symbols carried by each spatial stream, and M is an even greater than zero; and transmitting data using the OFDM symbols carried by the (2n−1)th space-time stream and the OFDM symbols carried by the 2 nth space-time stream which are obtained by the mapping.

According to another aspect of the disclosure, a device for mapping a spatial stream to a space-time stream is provided, including: a first determination module, configured to determine, according to a space-time encoding indication bit in a network, whether to adopt space-time encoding; and a first mapping module, configured to, if it is determined to adopt the space-time encoding, map M orthogonal frequency division multiplexing (OFDM) symbols carried by the nth spatial stream to OFDM symbols carried by the (2n−1)th space-time stream and OFDM symbols carried by the 2 nth space-time stream respectively, wherein n=1, 2, . . . , N, N is the total number of spatial streams in the network, M is the number of OFDM symbols carried by each spatial stream, and M is an even greater than zero.

The first mapping module is further configured to map M OFDM symbols carried by the nth spatial stream, according to an arrangement order of the M OFDM symbols in the nth spatial stream, to M OFDM symbols of the (2n−1)th space-time stream successively.

The first mapping module is further configured to map the opposite number of the conjugation of the 2mth OFDM symbol carried by the nth spatial stream to the (2m−1)th OFDM symbol of the 2 nth space-time stream; and map the conjugation of the (2m−1)th OFDM symbol carried by the nth spatial stream to the 2mth OFDM symbol of the 2 nth space-time stream, wherein m=1, 2, . . . , M/2.

The first mapping module is further configured to, when the number of the spatial streams in the network is 3, respectively map M OFDM symbols carried by each of the 3 spatial streams to 6 space-time streams.

The first mapping module is further configured to: map M OFDM symbols carried by the 1st spatial stream, according to an original order of the OFDM symbols, to M OFDM symbols of the 1st space-time stream successively; map the opposite number of the conjugation of the 2nd OFDM symbol carried by the 1st spatial stream to the 1st OFDM symbol of the 2nd space-time stream, map the conjugation of the 1st OFDM symbol carried by the 1st spatial stream to the 2nd OFDM symbol of the 2nd space-time stream, map the opposite number of the conjugation of the 4th OFDM symbol carried by the 1st spatial stream to the 3rd OFDM symbol of the 2nd space-time stream, map the conjugation of the 3rd OFDM symbol carried by the 1st spatial stream to the 4th OFDM symbol of the 2nd space-time stream, and according to a two-by-two crossover operation method for M OFDM symbols of the 1st spatial stream, map the opposite number of the conjugation of the Mth OFDM symbol carried by the 1st spatial stream to the (M−1)th OFDM symbol of the 2nd space-time stream and map the conjugation of the (M−1)th OFDM symbol carried by the 1st spatial stream to the Mth OFDM symbol of the 2nd space-time stream, to obtain the 2nd space-time stream; map M OFDM symbols carried by the 2nd spatial stream, according to an original order of the OFDM symbols, to M OFDM symbols of the 3rd space-time stream successively; map the opposite number of the conjugation of the 2nd OFDM symbol carried by the 2nd spatial stream to the 1st OFDM symbol of the 4th space-time stream, map the conjugation of the 1st OFDM symbol carried by the 2nd spatial stream to the 2nd OFDM symbol of the 4th space-time stream, map the opposite number of the conjugation of the 4th OFDM symbol carried by the 2nd spatial stream to the 3rd OFDM symbol of the 4th space-time stream, map the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, map the opposite number of the conjugation of the Mth OFDM symbol carried by the 2nd spatial stream to the (M−1)th OFDM symbol of the 4th space-time stream and map the conjugation of the (M−1)th OFDM symbol carried by the 2nd spatial stream to the Mth OFDM symbol of the 4th space-time stream, to obtain the 4th space-time stream; and map M OFDM symbols carried by the 3rd spatial stream, according to an original order of the OFDM symbols, to M OFDM symbols of the 5th space-time stream successively; map the opposite number of the conjugation of the 2nd OFDM symbol carried by the 3rd spatial stream to the 1st OFDM symbol of the 6th space-time stream, map the conjugation of the 1st OFDM symbol carried by the 3rd spatial stream to the 2nd OFDM symbol of the 6th space-time stream, map the opposite number of the conjugation of the 4th OFDM symbol carried by the 3rd spatial stream to the 3rd OFDM symbol of the 6th space-time stream, map the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, map the opposite number of the conjugation of the Mth OFDM symbol carried by the 3rd spatial stream to the (M−1)th OFDM symbol of the 6th space-time stream and map the conjugation of the (M−1)th OFDM symbol carried by the 3rd spatial stream to the Mth OFDM symbol of the 6th space-time stream, to obtain the 6th space-time stream.

The first mapping module is further configured to, when the number of the spatial streams in the network is 4, respectively map M OFDM symbols carried by each of the 4 spatial streams to 8 space-time streams.

The first mapping module is further configured to: map M OFDM symbols carried by the 1st spatial stream, according to an original order of the OFDM symbols, to M OFDM symbols of the 1st space-time stream successively; map the opposite number of the conjugation of the 2nd OFDM symbol carried by the 1st spatial stream to the 1st OFDM symbol of the 2nd space-time stream, map the conjugation of the 1st OFDM symbol carried by the 1st spatial stream to the 2nd OFDM symbol of the 2nd space-time stream, map the opposite number of the conjugation of the 4th OFDM symbol carried by the 1st spatial stream to the 3rd OFDM symbol of the 2nd space-time stream, map the conjugation of the 3rd OFDM symbol carried by the 1st spatial stream to the 4th OFDM symbol of the 2nd space-time stream, and according to a two-by-two crossover operation method for M OFDM symbols of the 1st spatial stream, map the opposite number of the conjugation of the Mth OFDM symbol carried by the 1st spatial stream to the (M−1)th OFDM symbol of the 2nd space-time stream and map the conjugation of the (M−1)th OFDM symbol carried by the 1st spatial stream to the Mth OFDM symbol of the 2nd space-time stream, to obtain the 2nd space-time stream; map M OFDM symbols carried by the 2nd spatial stream, according to an original order of the OFDM symbols, to M OFDM symbols of the 3rd space-time stream successively; map the opposite number of the conjugation of the 2nd OFDM symbol carried by the 2nd spatial stream to the 1st OFDM symbol of the 4th space-time stream, map the conjugation of the 1st OFDM symbol carried by the 2nd spatial stream to the 2nd OFDM symbol of the 4th space-time stream, map the opposite number of the conjugation of the 4th OFDM symbol carried by the 2nd spatial stream to the 3rd OFDM symbol of the 4th space-time stream, map the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, map the opposite number of the conjugation of the Mth OFDM symbol carried by the 2nd spatial stream to the (M−1)th OFDM symbol of the 4th space-time stream and map the conjugation of the (M−1)th OFDM symbol carried by the 2nd spatial stream to the Mth OFDM symbol of the 4th space-time stream, to obtain the 4th space-time stream; map M OFDM symbols carried by the 3rd spatial stream, according to an original order of the OFDM symbols, to M OFDM symbols of the 5th space-time stream successively; map the opposite number of the conjugation of the 2nd OFDM symbol carried by the 3rd spatial stream to the 1st OFDM symbol of the 6th space-time stream, map the conjugation of the 1st OFDM symbol carried by the 3rd spatial stream to the 2nd OFDM symbol of the 6th space-time stream, map the opposite number of the conjugation of the 4th OFDM symbol carried by the 3rd spatial stream to the 3rd OFDM symbol of the 6th space-time stream, map the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, map the opposite number of the conjugation of the Mth OFDM symbol carried by the 3rd spatial stream to the (M−1)th OFDM symbol of the 6th space-time stream and map the conjugation of the (M−1)th OFDM symbol carried by the 3rd spatial stream to the Mth OFDM symbol of the 6th space-time stream, to obtain the 6th space-time stream; and map M OFDM symbols carried by the 4th spatial stream, according to an original order of the OFDM symbols, to M OFDM symbols of the 7th space-time stream successively; map the opposite number of the conjugation of the 2nd OFDM symbol carried by the 4th spatial stream to the 1st OFDM symbol of the 8th space-time stream, map the conjugation of the 1st OFDM symbol carried by the 4th spatial stream to the 2nd OFDM symbol of the 8th space-time stream, map the opposite number of the conjugation of the 4th OFDM symbol carried by the 4th spatial stream to the 3rd OFDM symbol of the 8th space-time stream, map the conjugation of the 3rd OFDM symbol carried by the 4th spatial stream to the 4th OFDM symbol of the 8th space-time stream, and according to a two-by-two crossover operation method for M OFDM symbols of the 4th spatial stream, map the opposite number of the conjugation of the Mth OFDM symbol carried by the 4th spatial stream to the (M−1)th OFDM symbol of the 8th space-time stream and map the conjugation of the (M−1)th OFDM symbol carried by the 4th spatial stream to the Mth OFDM symbol of the 8th space-time stream, to obtain the 8th space-time stream.

The device further includes: a second mapping module, configured to, if it is determined not to adopt the space-time encoding, map the M OFDM symbols carried by the nth spatial stream, according to an arrangement order of the M OFDM symbols in the nth spatial stream, to M OFDM symbols carried by the nth space-time stream successively.

According to another aspect of the disclosure, a device for transmitting data is provided, including: a second determination module, configured to determine, according to a space-time encoding indication bit in a network, whether to adopt space-time encoding; a third mapping module, configured to, if it is determined to adopt the space-time encoding, map M orthogonal frequency division multiplexing (OFDM) symbols carried by the nth spatial stream to OFDM symbols carried by the (2n−1)th space-time stream and OFDM symbols carried by the 2 nth space-time stream respectively, wherein n=1, 2, ..., N, N is the total number of spatial streams in the network, M is the number of OFDM symbols carried by each spatial stream, and M is an even greater than zero; and a data transmission module, configured to transmit data using the OFDM symbols carried by the (2n−1)th space-time stream and the OFDM symbols carried by the 2 nth space-time stream which are obtained by the mapping.

In the embodiments of the disclosure, when it is determined to adopt space-time encoding according to a space-time encoding indication bit in a network, M OFDM symbols carried by the nth spatial stream are mapped to the OFDM symbols carried by the (2n−1)th space-time stream and the OFDM symbols carried by the 2 nth space-time stream respectively, which provides a specific method for mapping a spatial stream to a space-time stream adopting space-time encoding, realizes the object of performing data transmission adopting space-time encoding, thus improving the system performance without introducing any additional overhead with respect to the related art.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be explained below with reference to the drawings and in conjunction with the embodiments in detail.

The disclosure is described below with reference to the accompanying drawings and embodiments in detail. Note that, the embodiments of the disclosure and the features of the embodiments can be combined with each other if there is no conflict.

As mentioned in the related art, for the typical 802.11 ac ultrahigh throughput WLAN system, there is still no specific method for mapping a spatial stream to a space-time stream adopting space-time encoding currently. Therefore, how to map a spatial stream to a space-time stream adopting space-time encoding in a typical ultrahigh throughput WLAN system is a problem urgent to be solved. In order to solve the above-mentioned technical problem, the embodiments of the disclosure provide a method for mapping a spatial stream to a space-time stream. The processing flow of the method for mapping a spatial stream to a space-time stream is as shown in FIG. 1 and includes:

step S102: it is determined, according to a space-time encoding indication bit in a network, whether to adopt space-time encoding; and step S104: if it is determined to adopt the space-time encoding, then M OFDM symbols carried by the nth spatial stream are mapped to OFDM symbols carried by the (2n−1)th space-time stream and OFDM symbols carried by the 2 nth space-time stream respectively, wherein n=1, 2, . . . , N, N is the total number of spatial streams in the network, M is the number of OFDM symbols carried by each spatial stream, and M is an even greater than zero.

In the embodiment of the disclosure, when it is determined to adopt space-time encoding according to a space-time encoding indication bit in a network, M OFDM symbols carried by the nth spatial stream are mapped to the OFDM symbols carried by the (2n−1)th space-time stream and the OFDM symbols carried by the 2 nth space-time stream respectively, which provides a specific method for mapping a spatial stream to a space-time stream adopting space-time encoding, realizes the object of performing data transmission adopting space-time encoding, thus improving the system performance without introducing any additional overhead with respect to the related art.

Figure 1:
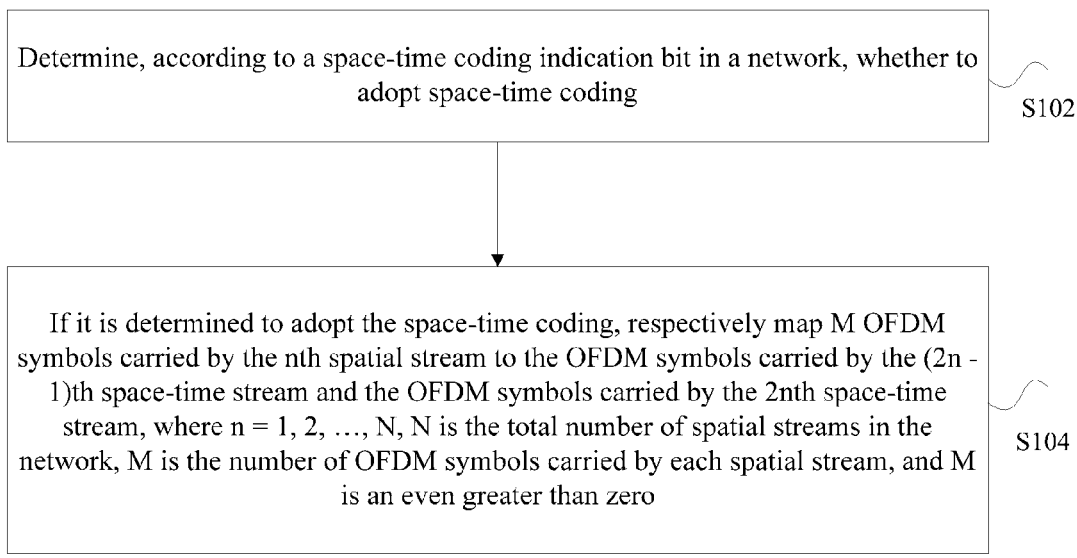
FIG. 1 is a processing flowchart of a method for mapping a spatial stream to a space-time stream according to an embodiment of the disclosure.

In the flow as shown in FIG. 1, during the implementation of step S104, there can be a variety of implementations for mapping the OFDM symbols carried by the nth spatial stream to the OFDM symbols carried by the (2n−1)th space-time stream. For example, the implementations for mapping the OFDM symbols carried by the nth spatial stream to the OFDM symbols carried by the (2n−1)th space-time stream may be one-to-one mapping, or one-to-multiple mapping, or multiple-to-one mapping, or interleaved mapping and so on. However, during specific implementation, in order to ensure mapping accuracy, it is preferable to adopt one-to-one mapping. For example, mapping may be done according to the following steps: M OFDM symbols carried by the nth spatial stream are mapped, according to the arrangement order of the M OFDM symbols in the nth spatial stream, to M OFDM symbols carried by the (2n−1)th space-time stream successively.

Likewise, during the implementation of step S104, there can be a variety of implementations for mapping the OFDM symbols carried by the nth spatial stream to the OFDM symbols carried by the 2 nth space-time stream. For example, the implementations for mapping the OFDM symbols carried by the nth spatial stream to the OFDM symbols carried by the 2 nth space-time stream may be one-to-one mapping, one-to-multiple mapping, multiple-to-one mapping, and interleaved mapping and so on as mentioned above. However, during specific implementation, in order to ensure mapping accuracy, it is preferable to adopt one-to-one mapping. For example, mapping may be done according to the following steps:

the opposite number of the conjugation of the 2mth OFDM symbol carried by the nth spatial stream is mapped to the (2m−1)th OFDM symbol in the 2 nth space-time stream; and the conjugate of the (2m−1)th OFDM symbol carried by the nth spatial stream is mapped to the 2mth OFDM symbol in the 2 nth space-time stream, wherein m=1, 2, . . . , M/2.

During implementation, the space-time encoding indication bit in the network can not only indicate to adopt space-time encoding but can also indicate not to adopt space-time encoding, and at this moment, the adopted mapping method may be as follows: M OFDM symbols carried by the nth spatial stream are mapped, according to the arrangement order of the M OFDM symbols in the nth spatial stream, to M OFDM symbols carried by the nth space-time stream successively.

Figure 2:
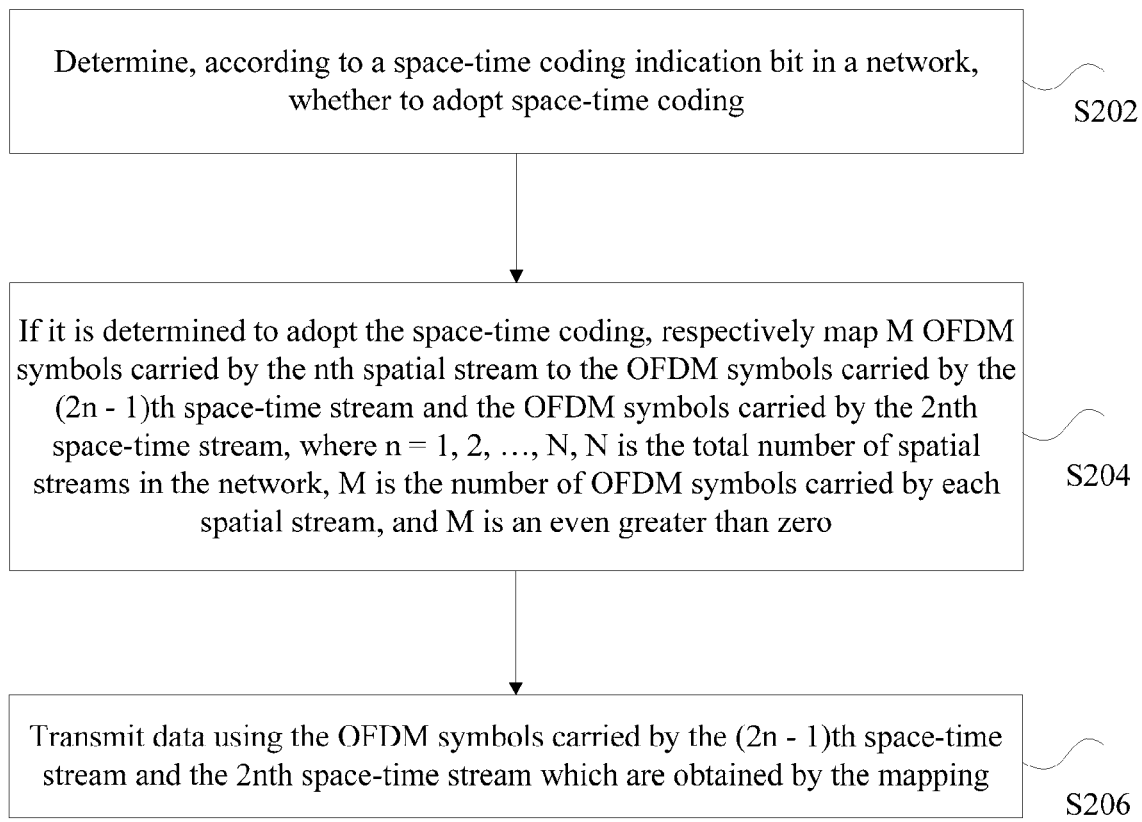
FIG. 2 is a processing flowchart of a method for transmitting data according to an embodiment of the disclosure.

When using the method for mapping a spatial stream to a space-time stream provided in the embodiment of the disclosure, during subsequent data transmission, the mapped space-time stream can be used to perform data transmission, so as to improve system performance. That is, based on the same inventive concept, an embodiment of the disclosure also provides a method for transmitting data, the processing flow of which is as shown in FIG. 2 and includes:

step S202: it is determined, according to a space-time encoding indication bit in a network, whether to adopt space-time encoding;

step S204: if it is determined to adopt the space-time encoding, M OFDM symbols carried by the nth spatial stream are mapped to OFDM symbols carried by the (2n−1)th space-time stream and OFDM symbols carried by the 2 nth space-time stream respectively, wherein n=1, 2, . . . , N, N is the total number of spatial streams in the network, M is the number of OFDM symbols carried by each spatial stream, and M is an even greater than zero; and step S206: data are transmitted using the OFDM symbols carried by the (2n−1)th space-time stream and the OFDM symbols carried by the 2 nth space-time stream which are obtained by the mapping.

In the embodiment of the disclosure, when it is determined to adopt space-time encoding according to a space-time encoding indication bit in a network, M OFDM symbols carried by the nth spatial stream are mapped to the OFDM symbols carried by the (2n−1)th space-time stream and the OFDM symbols carried by the 2 nth space-time stream respectively, which provides a specific method for mapping a spatial stream to a space-time stream adopting space-time encoding and uses the OFDM symbols carried by the (2n−1)th space-time stream and the 2 nth space-time stream which are obtained by the mapping to perform data transmission, realizes the object of performing data transmission adopting space-time encoding, thus improving the system performance without introducing any additional overhead with respect to the related art.

In order to more clearly illustrate the method for mapping a spatial stream to a space-time stream and the method for transmitting data provided in the embodiments of the disclosure, several specific embodiments are taken as examples for description. The following embodiments are embodiments regarding a typical ultrahigh throughput network system, such as 802.11 ac in WLAN. For the sake of easy description, it is assumed that each spatial stream has M OFDM symbols, and each OFDM symbol has N effective sub-carriers.

Embodiment 1

For one spatial stream, when a signaling indicates not to adopt space-time encoding, M OFDM symbols carried by this spatial stream are mapped, according to the original order of M OFDM symbols in this spatial stream, to M OFDM symbols of a space-time stream successively.

When the signaling indicates to adopt space-time encoding, M OFDM symbols carried by this spatial stream are mapped, according to the original order of the M OFDM symbols in this spatial stream, to M OFDM symbols of the 1st space-time stream successively. Then, the opposite number of the conjugation of the 2nd OFDM symbol carried by this spatial stream is mapped to the 1st OFDM symbol of the 2nd space-time stream, the conjugation of the 1st OFDM symbol carried by this spatial stream is mapped to the 2nd OFDM symbol of the 2nd space-time stream, the opposite number of the conjugation of the 4th OFDM symbol carried by this spatial stream is mapped to the 3rd OFDM symbol of the 2nd space-time stream, and the conjugation of the 3rd OFDM symbol carried by this spatial stream is mapped to the 4th OFDM symbol of the 2nd space-time stream, and so on, each two symbols are mapped according to the above-mentioned method to obtain the 2nd space-time stream.

Embodiment 2

For two spatial streams, when a signaling indicates not to adopt space-time encoding, M OFDM symbols carried by each of these two spatial streams are mapped, according to the original order of M OFDM symbols in each of these two spatial streams, to M OFDM symbols of each of two space-time streams successively.

When the signaling indicates to adopt space-time encoding, M OFDM symbols carried by the 1st spatial stream are mapped, according to the original order of the M OFDM symbols in the 1st spatial stream, to M OFDM symbols of the 1st space-time stream successively. Then, the opposite number of the conjugation of the 2nd OFDM symbol carried by this spatial stream is mapped to the 1st OFDM symbol of the 2nd space-time stream, the conjugation of the 1st OFDM symbol carried by this spatial stream is mapped to the 2nd OFDM symbol of the 2nd space-time stream, the opposite number of the conjugation of the 4th OFDM symbol carried by this spatial stream is mapped to the 3rd OFDM symbol of the 2nd space-time stream, and the conjugation of the 3rd OFDM symbol carried by this spatial stream is mapped to the 4th OFDM symbol of the 2nd space-time stream, and so on, each two symbols are mapped according to the above-mentioned method to obtain the 2nd space-time stream.

The 2nd spatial stream is mapped to the 3rd and 4th space-time streams also using the above-mentioned method. In this way, 4 space-time streams are finally obtained.

Embodiment 3

For three spatial streams, when a signaling indicates not to adopt space-time encoding, M OFDM symbols carried by each of these three spatial streams are mapped, according to the original order of M OFDM symbols in each of these three spatial streams, to M OFDM symbols of each of three space-time streams successively.

When the signaling indicates to adopt space-time encoding, M OFDM symbols carried by the 1st spatial stream are mapped, according to the original order of the M OFDM symbols in the 1st spatial stream, to M OFDM symbols of the 1st space-time stream successively. Then, the opposite number of the conjugation of the 2nd OFDM symbol carried by this spatial stream is mapped to the 1st OFDM symbol of the 2nd space-time stream, the conjugation of the 1st OFDM symbol carried by this spatial stream is mapped to the 2nd OFDM symbol of the 2nd space-time stream, the opposite number of the conjugation of the 4th OFDM symbol carried by this spatial stream is mapped to the 3rd OFDM symbol of the 2nd space-time stream, and the conjugation of the 3rd OFDM symbol carried by this spatial stream is mapped to the 4th OFDM symbol of the 2nd space-time stream, and so on, each two symbols are mapped according to the above-mentioned method to obtain the 2nd space-time stream.

The 2nd spatial stream is mapped to the 3rd and 4th space-time streams also using the above-mentioned method. The 3rd spatial stream is mapped to the 5th and 6th space-time streams also using the above-mentioned method. In this way, 6 space-time streams are finally obtained.

Embodiment 4

For four spatial streams, when a signaling indicates not to adopt space-time encoding, M OFDM symbols carried by each of these four spatial streams are mapped, according to the original order of M OFDM symbols in each of these four spatial streams, to M OFDM symbols of each of four space-time streams successively.

When the signaling indicates to adopt space-time encoding, M OFDM symbols carried by the 1st spatial stream are mapped, according to the original order of the M OFDM symbols in the 1st spatial stream, to M OFDM symbols of the 1st space-time stream successively. Then, the opposite number of the conjugation of the 2nd OFDM symbol carried by the 1st spatial stream is mapped to the 1st OFDM symbol of the 2nd space-time stream, the conjugation of the 1st OFDM symbol carried by this spatial stream is mapped to the 2nd OFDM symbol of the 2nd space-time stream, the opposite number of the conjugation of the 4th OFDM symbol carried by this spatial stream is mapped to the 3rd OFDM symbol of the 2nd space-time stream, and the conjugation of the 3rd OFDM symbol carried by this spatial stream is mapped to the 4th OFDM symbol of the 2nd space-time stream, and so on, each two symbols are mapped according to the above-mentioned method to obtain the 2nd space-time stream.

The 2nd spatial stream is mapped to the 3rd and 4th space-time streams also using the above-mentioned method. The 3rd spatial stream is mapped to the 5th and 6th space-time streams also using the above-mentioned method. The 4th spatial stream is mapped to the 7th and 8th space-time stream also using the above-mentioned method. In this way, 8 space-time streams are finally obtained.

Embodiment 5

For 5, 6, 7 or 8 spatial streams, space-time encoding cannot be used. M OFDM symbols carried by each of these 5, 6, 7 or 8 spatial streams are mapped, according to the original order of M OFDM symbols in each of these 5, 6, 7 or 8 spatial streams, to M OFDM symbols of each of 5, 6, 7 or 8 space-time streams successively.

Figure 3:
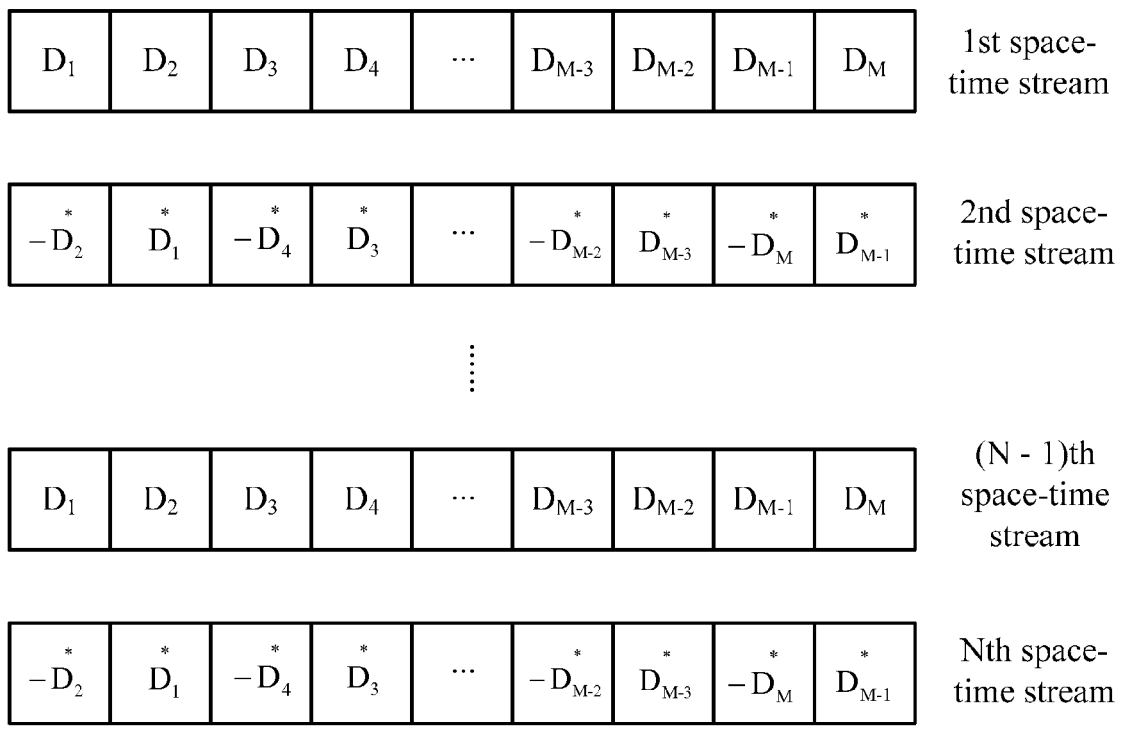
FIG. 3 is a schematic diagram of a space-time stream generated through mapping according to embodiment 1 in the embodiments of the disclosure.

The schematic diagram of the space-time streams generated after the mapping of the above-mentioned embodiment 1 to embodiment 5 is as shown in FIG. 3. The data blocks carried on each OFDM symbol are D1, D2, D3, D4 ... $D_{M-3}$, $D_{M-2}$, $D_{M-1}$, $D_M$, where * is to perform a conjugation operation.

During implementation, if the space-time encoding indication bit of WLAN is used to determine whether to adopt space-time encoding, usually a space-time block code (STBC) field in a very high throughput signal field type A (VHT-SIG-A) signaling can be used as the space-time encoding indication bit. For different streams, when the STBC field in VHT-SIG-A is set as 0, it indicates not to adopt space-time encoding, and when the STBC field in VHT-SIG-A is set as 1, it indicates to adopt space-time encoding. The specific mapping when adopting space-time encoding is as shown in Table 1.

TABLE 1

| $N_{STS}$ | $N_{SS}$ | VHT-SIG-A STBC Field | $i_{STS}$ | $\tilde{d}_{k,i,2m}$ | $\tilde{d}_{k,i,2m+1}$ |
|---|---|---|---|---|---|
| 2 | 1 | 1 | 1 | $d_{k,1,2m}$ | $d_{k,1,2m+1}$ |
|  |  |  | 2 | $-d^*_{k,1,2m+1}$ | $d^*_{k,1,2m}$ |
| 4 | 2 | 1 | 1 | $d_{k,1,2m}$ | $d_{k,1,2m+1}$ |
|  |  |  | 2 | $-d^*_{k,1,2m+1}$ | $d^*_{k,1,2m}$ |
|  |  |  | 3 | $d_{k,2,2m}$ | $d_{k,2,2m+1}$ |
|  |  |  | 4 | $-d^*_{k,2,2m+1}$ | $d^*_{k,2,2m}$ |

TABLE 1-continued

| $N_{STS}$ | $N_{SS}$ | VHT-SIG-A STBC Field | $i_{STS}$ | $\tilde{d}_{k,i,2m}$ | $\tilde{d}_{k,i,2m+1}$ |
|---|---|---|---|---|---|
| 6 | 3 | 1 | 1 | $d_{k,1,2m}$ | $d_{k,1,2m+1}$ |
|   |   |   | 2 | $-\acute{d}_{k,1,2m+1}$ | $\acute{d}_{k,1,2m}$ |
|   |   |   | 3 | $d_{k,2,2m}$ | $d_{k,2,2m+1}$ |
|   |   |   | 4 | $-\acute{d}_{k,2,2m+1}$ | $\acute{d}_{k,2,2m}$ |
|   |   |   | 5 | $d_{k,3,2m}$ | $d_{k,3,2m+1}$ |
|   |   |   | 6 | $-\acute{d}_{k,3,2m+1}$ | $\acute{d}_{k,3,2m}$ |
| 8 | 4 | 1 | 1 | $d_{k,1,2m}$ | $d_{k,1,2m+1}$ |
|   |   |   | 2 | $-\acute{d}_{k,1,2m+1}$ | $\acute{d}_{k,1,2m}$ |
|   |   |   | 3 | $d_{k,2,2m}$ | $d_{k,2,2m+1}$ |
|   |   |   | 4 | $-\acute{d}_{k,2,2m+1}$ | $\acute{d}_{k,2,2m}$ |
|   |   |   | 5 | $d_{k,3,2m}$ | $d_{k,3,2m+1}$ |
|   |   |   | 6 | $-\acute{d}_{k,3,2m+1}$ | $\acute{d}_{k,3,2m}$ |
|   |   |   | 7 | $d_{k,4,2m}$ | $d_{k,4,2m+1}$ |
|   |   |   | 8 | $-\acute{d}_{k,4,2m+1}$ | $\acute{d}_{k,4,2m}$ | where $N_{STS}$ is the number of space-time streams, $N_{SS}$ is the number of spatial streams, $i_{STS}$ represents which space-time stream, $d_{k,i,n}$ represents the corresponding data on each efficient sub-carrier of each OFDM symbol of each spatial stream, where $k = 0, 1, 2 \ldots N - 1$; $i = 0, 1, 2 \ldots N_{SS}$; $n = 0, 1, 2 \ldots M - 1$; $\tilde{d}_{k,i,n}$ represents the corresponding data on each efficient sub-carrier of each OFDM symbol of each space-time stream, $k = 0, 1, 2 \ldots N - 1$; $i = 0, 1, 2 \ldots N_{STS}$; $n = 0, 1, 2 \ldots M - 1$; in the table, $m = 0, 1, 2 \ldots M/2 - 1$.

During specific implementation, the STBC field of VHT-SIG-A being used as the space-time encoding indication bit is merely a preferred embodiment. The space-time encoding indication bit is not limited to the STBC field in VHT-SIG-A, other signaling or fields can be selected as the space-time encoding indication bit according to the actual situation, for example, different signaling and fields may be selected for different networks.

Figure 4:
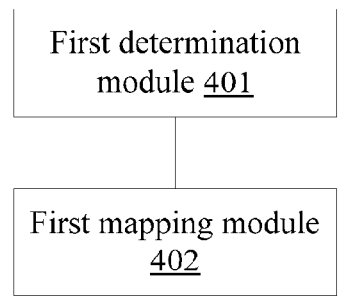
FIG. 4 is a first structural schematic diagram of a device for mapping a spatial stream to a space-time stream according to an embodiment of the disclosure.

Based on the same inventive concept, the structure of a device for mapping a spatial stream to a space-time stream in an embodiment of the disclosure is as shown in FIG. 4, including:

a first determination module 401, configured to determine, according to a space-time encoding indication bit in a network, whether to adopt space-time encoding; and a first mapping module 402, configured to, if it is determined to adopt the space-time encoding, map M OFDM symbols carried by the nth spatial stream to OFDM symbols carried by the (2n−1)th space-time stream and OFDM symbols carried by the 2 nth space-time stream respectively, where n=1, 2, . . . , N, N is the total number of spatial streams in the network, M is the number of OFDM symbols carried by each spatial stream, and M is an even greater than zero.

In an embodiment, the first mapping module 402 is further configured to map M OFDM symbols carried by the nth spatial stream, according to an arrangement order of the M OFDM symbols in the nth spatial stream, to M OFDM symbols carried by the (2n−1)th space-time stream successively.

In an embodiment, the first mapping module 402 is further configured to map the opposite number of the conjugation of the 2mth OFDM symbol carried by the nth spatial stream to the (2m−1)th OFDM symbol in the 2 nth space-time stream; and map the conjugation of the (2m−1)th OFDM symbol carried by the nth spatial stream to the 2mth OFDM symbol of the 2 nth space-time stream, where m=1, 2, . . . , M/2.

Figure 5:
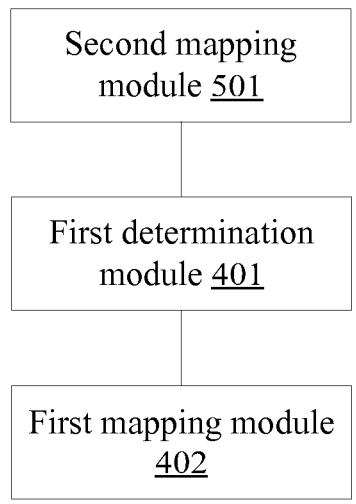
FIG. 5 is a second structural schematic diagram of a device for mapping a spatial stream to a space-time stream according to an embodiment of the disclosure.

In an embodiment, as shown in FIG. 5, the device for mapping a spatial stream to a space-time stream may further include:

a second mapping module 501, configured to, if it is determined not to adopt the space-time encoding, map M OFDM symbols carried by the nth spatial stream, according to the arrangement order of the M OFDM symbols in the nth spatial stream, to M OFDM symbols carried by the nth space-time stream successively.

Figure 6:
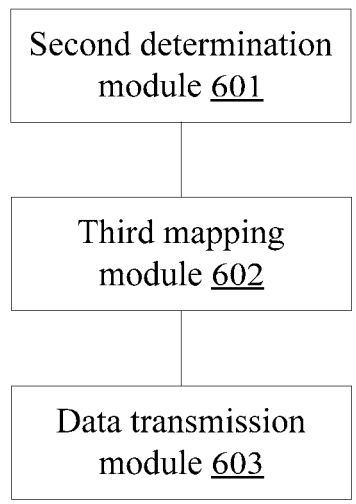
FIG. 6 is a structural schematic diagram of a device for transmitting data according to an embodiment of the disclosure.

Based on the same inventive concept, an embodiment of the disclosure also provide a device for transmitting data, the structure of which is as shown in FIG. 6, including:

a second determination module 601, configured to determine, according to a space-time encoding indication bit in a network, whether to adopt space-time encoding;

a third mapping module 602, configured to, if it is determined to adopt the space-time encoding, map M OFDM symbols carried by the nth spatial stream to OFDM symbols carried by the (2n−1)th space-time stream and OFDM symbols carried by the 2 nth space-time stream respectively, where n=1, 2, . . . , N, N is the total number of spatial streams in the network, M is the number of OFDM symbols carried by each spatial stream, and M is an even greater than zero; and a data transmission module 603, configured to transmit data using the OFDM symbols carried by the (2n−1)th space-time stream and the OFDM symbols carried by the 2 nth space-time stream which are obtained by the mapping.

During implementation, the third mapping module 602 may be further configured to, if it is determined not to adopt the space-time encoding, map M OFDM symbols carried by the nth spatial stream, according to the arrangement order of the M OFDM symbols in the nth spatial stream, to M OFDM symbols carried by the nth space-time stream successively.

The data transmission module 603 may be further configured to transmit data using the OFDM symbols carried by the nth space-time stream which are obtained by the mapping.

From the description above, it can be seen that the disclosure achieves the following technique effects.

In the embodiments of the disclosure, when it is determined to adopt space-time encoding according to a space-time encoding indication bit in a network, M OFDM symbols carried by the nth spatial stream are mapped to the OFDM symbols carried by the (2n−1)th space-time stream and the OFDM symbols carried by the 2 nth space-time stream respectively, which provides a specific method for mapping a spatial stream to a space-time stream adopting space-time encoding, realizes the object of performing data transmission adopting space-time encoding, thus improving the system performance without introducing any additional overhead with respect to the related art.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for mapping a spatial stream to a space-time stream, comprising:

determining, according to a space-time encoding indication bit in a network, to adopt space-time encoding; and
mapping M orthogonal frequency division multiplexing (OFDM) symbols carried by nth spatial stream to OFDM symbols carried by (2n−1)th space-time stream and OFDM symbols carried by 2nth space-time stream respectively, wherein n=1, 2, ..., N, N is a total number of spatial streams in the network, M is a number of OFDM symbols carried by each spatial stream, and the M is an even number greater than zero;

wherein when the number of the spatial streams in the network is 3, M OFDM symbols carried by each of the 3 spatial streams are respectively mapped to 6 space-time streams;

when the number of the spatial streams in the network is 4, M OFDM symbols carried by each of the 4 spatial streams are respectively mapped to 8 space-time streams;

wherein when the number N of the spatial streams in the network is 3, respectively mapping the M OFDM symbols carried by each of the 3 spatial streams to 6 space-time streams comprises:

mapping M OFDM symbols carried by the 1st spatial stream, according to an original order of the OFDM symbols, to M OFDM symbols of the 1st space-time stream successively;

mapping the opposite number of the conjugation of the 2nd OFDM symbol carried by the 1st spatial stream to the 1st OFDM symbol of the 2nd space-time stream, mapping the conjugation of the 1st OFDM symbol carried by the 1st spatial stream to the 2nd OFDM symbol of the 2nd space-time stream, mapping the opposite number of the conjugation of the 4th OFDM symbol carried by the 1st spatial stream to the 3rd OFDM symbol of the 2nd space-time stream, mapping the conjugation of the 3rd OFDM symbol carried by the 1st spatial stream to the 4th OFDM symbol of the 2nd space-time stream, and according to a two-by-two crossover operation method for M OFDM symbols of the 1st spatial stream, mapping the opposite number of the conjugation of the Mth OFDM symbol carried by the 1st spatial stream to the (M−1)th OFDM symbol of the 2nd space-time stream and mapping the conjugation of the (M−1)th OFDM symbol carried by the 1st spatial stream to the Mth OFDM symbol of the 2nd space-time stream, to obtain the 2nd space-time stream;

mapping M OFDM symbols carried by the 2nd spatial stream, according to an original order of the OFDM symbols, to M OFDM symbols of the 3rd space-time stream successively;

mapping the opposite number of the conjugation of the 2nd OFDM symbol carried by the 2nd spatial stream to the 1st OFDM symbol of the 4th space-time stream, mapping the conjugation of the 1st OFDM symbol carried by the 2nd spatial stream to the 2nd OFDM symbol of the 4th space-time stream, mapping the opposite number of the conjugation of the 4th OFDM symbol carried by the 2nd spatial stream to the 3rd OFDM symbol of the 4th space-time stream, mapping the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, mapping the opposite number of the conjugation of the Mth OFDM symbol carried by the 2nd spatial stream to the (M−1)th OFDM symbol of the 4th space-time stream and mapping the conjugation of the (M−1)th OFDM symbol carried by the 2nd spatial stream to the Mth OFDM symbol of the 4th space-time stream, to obtain the 4th space-time stream;

mapping M OFDM symbols carried by the 3rd spatial stream, according to an original order of the OFDM symbols, to M OFDM symbols of the 5th space-time stream successively; and mapping the opposite number of the conjugation of the 2nd OFDM symbol carried by the 3rd spatial stream to the 1st OFDM symbol of the 6th space-time stream, mapping the conjugation of the 1st OFDM symbol carried by the 3rd spatial stream to the 2nd OFDM symbol of the 6th space-time stream, mapping the opposite number of the conjugation of the 4th OFDM symbol carried by the 3rd spatial stream to the 3rd OFDM symbol of the 6th space-time stream, mapping the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, mapping the opposite number of the conjugation of the Mth OFDM symbol carried by the 3rd spatial stream to the (M−1)th OFDM symbol of the 6th space-time stream and mapping the conjugation of the (M−1)th OFDM symbol carried by the 3rd spatial stream to the Mth OFDM symbol of the 6th space-time stream, to obtain the 6th space-time stream;

wherein when the number N of the spatial streams in the network is 4, respectively mapping the M OFDM symbols carried by each of the 4 spatial streams to 8 space-time streams comprises:

mapping M OFDM symbols carried by the 1st spatial stream, according to an original order of the OFDM symbols, to M OFDM symbols of the 1st space-time stream successively;

mapping the opposite number of the conjugation of the 2nd OFDM symbol carried by the 1st spatial stream to the 1st OFDM symbol of the 2nd space-time stream, mapping the conjugation of the 1st OFDM symbol carried by the 1st spatial stream to the 2nd OFDM symbol of the 2nd space-time stream, mapping the opposite number of the conjugation of the 4th OFDM symbol carried by the 1st spatial stream to the 3rd OFDM symbol of the 2nd space-time stream, mapping the conjugation of the 3rd OFDM symbol carried by the 1st spatial stream to the 4th OFDM symbol of the 2nd space-time stream, and according to a two-by-two crossover operation method for M OFDM symbols of the 1st spatial stream, mapping the opposite number of the conjugation of the Mth OFDM symbol carried by the 1st spatial stream to the (M−1)th OFDM symbol of the 2nd space-time stream and mapping the conjugation of the (M−1)th OFDM symbol carried by the 1st spatial stream to the Mth OFDM symbol of the 2nd space-time stream, to obtain the 2nd space-time stream;

mapping M OFDM symbols carried by the 2nd spatial stream, according to an original order of the OFDM symbols, to M OFDM symbols of the 3rd space-time stream successively;

mapping the opposite number of the conjugation of the 2nd OFDM symbol carried by the 2nd spatial stream to the 1st OFDM symbol of the 4th space-time stream, mapping the conjugation of the 1st OFDM symbol carried by the 2nd spatial stream to the 2nd OFDM symbol of the 4th space-time stream, mapping the opposite number of the conjugation of the 4th OFDM symbol carried by the 2nd spatial stream to the 3rd OFDM symbol of the 4th space-time stream, mapping the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, mapping the opposite number of the conjugation of the Mth OFDM symbol carried by the 2nd spatial stream to the (M−1)th OFDM symbol of the 4th space-time stream and mapping the conjugation of the (M−1)th OFDM symbol carried by the 2nd spatial stream to the Mth OFDM symbol of the 4th space-time stream, to obtain the 4th space-time stream;

mapping M OFDM symbols carried by the 3rd spatial stream, according to an original order of the OFDM symbols, to M OFDM symbols of the 5th space-time stream successively;

mapping the opposite number of the conjugation of the 2nd OFDM symbol carried by the 3rd spatial stream to the 1st OFDM symbol of the 6th space-time stream, mapping the conjugation of the 1st OFDM symbol carried by the 3rd spatial stream to the 2nd OFDM symbol of the 6th space-time stream, mapping the opposite number of the conjugation of the 4th OFDM symbol carried by the 3rd spatial stream to the 3rd OFDM symbol of the 6th space-time stream, mapping the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, mapping the opposite number of the conjugation of the Mth OFDM symbol carried by the 3rd spatial stream to the (M−1)th OFDM symbol of the 6th space-time stream and mapping the conjugation of the (M−1)th OFDM symbol carried by the 3rd spatial stream to the Mth OFDM symbol of the 6th space-time stream, to obtain the 6th space-time stream;

mapping M OFDM symbols carried by the 4th spatial stream, according to an original order of the OFDM symbols, to M OFDM symbols of the 7th space-time stream successively; and mapping the opposite number of the conjugation of the 2nd OFDM symbol carried by the 4th spatial stream to the 1st OFDM symbol of the 8th space-time stream, mapping the conjugation of the 1st OFDM symbol carried by the 4th spatial stream to the 2nd OFDM symbol of the 8th space-time stream, mapping the opposite number of the conjugation of the 4th OFDM symbol carried by the 4th spatial stream to the 3rd OFDM symbol of the 8th space-time stream, mapping the conjugation of the 3rd OFDM symbol carried by the 4th spatial stream to the 4th OFDM symbol of the 8th space-time stream, and according to a two-by-two crossover operation method for M OFDM symbols of the 4th spatial stream, mapping the opposite number of the conjugation of the Mth OFDM symbol carried by the 4th spatial stream to the (M−1)th OFDM symbol of the 8th space-time stream and mapping the conjugation of the (M−1)th OFDM symbol carried by the 4th spatial stream to the Mth OFDM symbol of the 8th space-time stream, to obtain the 8th space-time stream.

2. The method according to claim 1, wherein mapping the OFDM symbols carried by the nth spatial stream to the OFDM symbols carried by the (2n−1)th space-time stream comprises:

mapping the M OFDM symbols carried by the nth spatial stream, according to an arrangement order of the M OFDM symbols in the nth spatial stream, to M OFDM symbols of the (2n−1)th space-time stream successively, wherein mapping the OFDM symbols carried by the nth spatial stream to the OFDM symbols carried by the 2nth space-time stream comprises:

mapping the opposite number of the conjugation of the 2mth OFDM symbol carried by the nth spatial stream to the (2m−1)th OFDM symbol of the 2nth space-time stream; and mapping the conjugation of the (2m−1)th OFDM symbol carried by the nth spatial stream to the 2mth OFDM symbol of the 2nth space-time stream, wherein m=1, 2, . . . , M/2.

3. The method according to claim 1 further comprising:

transmitting data using the OFDM symbols carried by the (2n−1)th space-time stream and the OFDM symbols carried by the 2nth space-time stream which are obtained by the mapping.

4. A device for mapping a spatial stream to a space-time stream, comprising:

a first determination module, configured to determine, according to a space-time encoding indication bit in a network, to adopt space-time encoding; and a first mapping module, configured to map M orthogonal frequency division multiplexing (OFDM) symbols carried by nth spatial stream to OFDM symbols carried by (2n−1)th space-time stream and OFDM symbols carried by 2nth space-time stream respectively, wherein n=1, 2, . . . , N, N is a total number of spatial streams in the network, M is a number of OFDM symbols carried by each spatial stream, and the M is an even number greater than zero;

wherein the first mapping module is further configured to, when the number of the spatial streams in the network is 3, respectively map M OFDM symbols carried by each of the 3 spatial streams to 6 space-time streams;

the first mapping module is further configured to, when the number of the spatial streams in the network is 4, respectively map M OFDM symbols carried by each of the 4 spatial streams to 8 space-time streams;

wherein the first mapping module is further configured to:

map M OFDM symbols carried by the 1st spatial stream, according to an original order of the OFDM symbols, to M OFDM symbols of the 1st space-time stream successively; map the opposite number of the conjugation of the 2nd OFDM symbol carried by the 1st spatial stream to the 1st OFDM symbol of the 2nd space-time stream, map the conjugation of the 1st OFDM symbol carried by the 1st spatial stream to the 2nd OFDM symbol of the 2nd space-time stream, map the opposite number of the conjugation of the 4th OFDM symbol carried by the 1st spatial stream to the 3rd OFDM symbol of the 2nd space-time stream, map the conjugation of the 3rd OFDM symbol carried by the 1st spatial stream to the 4th OFDM symbol of the 2nd space-time stream, and according to a two-by-two crossover operation method for M OFDM symbols of the 1st spatial stream, map the opposite number of the conjugation of the Mth OFDM symbol carried by the 1st spatial stream to the (M−1)th OFDM symbol of the 2nd space-time stream and map the conjugation of the (M−1)th OFDM symbol carried by the 1st spatial stream to the Mth OFDM symbol of the 2nd space-time stream, to obtain the 2nd space-time stream;

map M OFDM symbols carried by the 2nd spatial stream, according to an original order of the OFDM symbols, to M OFDM symbols of the 3rd space-time stream successively; map the opposite number of the conjugation of the 2nd OFDM symbol carried by the 2nd spatial stream to the 1st OFDM symbol of the 4th space-time stream, map the conjugation of the 1st OFDM symbol carried by the 2nd spatial stream to the 2nd OFDM symbol of the 4th space-time stream, map the opposite number of the conjugation of the 4th OFDM symbol carried by the 2nd spatial stream to the 3rd OFDM symbol of the 4th space-time stream, map the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, map the opposite number of the conjugation of the Mth OFDM symbol carried by the 2nd spatial stream to the (M−1)th OFDM symbol of the 4th space-time stream and map the conjugation of the (M−1)th OFDM symbol carried by the 2nd spatial stream to the Mth OFDM symbol of the 4th space-time stream, to obtain the 4th space-time stream; and map M OFDM symbols carried by the 3rd spatial stream, according to an original order of the OFDM symbols, to M OFDM symbols of the 5th space-time stream successively; map the opposite number of the conjugation of the 2nd OFDM symbol carried by the 3rd spatial stream to the 1st OFDM symbol of the 6th space-time stream, map the conjugation of the 1st OFDM symbol carried by the 3rd spatial stream to the 2nd OFDM symbol of the 6th space-time stream, map the opposite number of the conjugation of the 4th OFDM symbol carried by the 3rd spatial stream to the 3rd OFDM symbol of the 6th space-time stream, map the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, map the opposite number of the conjugation of the Mth OFDM symbol carried by the 3rd spatial stream to the (M−1)th OFDM symbol of the 6th space-time stream and map the conjugation of the (M−1)th OFDM symbol carried by the 3rd spatial stream to the Mth OFDM symbol of the 6th space-time stream, to obtain the 6th space-time stream;

wherein the first mapping module is further configured to:

map M OFDM symbols carried by the 1st spatial stream, according to an original order of the OFDM symbols, to M OFDM symbols of the 1st space-time stream successively; map the opposite number of the conjugation of the 2nd OFDM symbol carried by the 1st spatial stream to the 1st OFDM symbol of the 2nd space-time stream, map the conjugation of the 1st OFDM symbol carried by the 1st spatial stream to the 2nd OFDM symbol of the 2nd space-time stream, map the opposite number of the conjugation of the 4th OFDM symbol carried by the 1st spatial stream to the 3rd OFDM symbol of the 2nd space-time stream, map the conjugation of the 3rd OFDM symbol carried by the 1st spatial stream to the 4th OFDM symbol of the 2nd space-time stream, and according to a two-by-two crossover operation method for M OFDM symbols of the 1st spatial stream, map the opposite number of the conjugation of the Mth OFDM symbol carried by the 1st spatial stream to the (M−1)th OFDM symbol of the 2nd space-time stream and map the conjugation of the (M−1)th OFDM symbol carried by the 1st spatial stream to the Mth OFDM symbol of the 2nd space-time stream, to obtain the 2nd space-time stream;

map M OFDM symbols carried by the 2nd spatial stream, according to an original order of the OFDM symbols, to M OFDM symbols of the 3rd space-time stream successively; map the opposite number of the conjugation of the 2nd OFDM symbol carried by the 2nd spatial stream to the 1st OFDM symbol of the 4th space-time stream, map the conjugation of the 1st OFDM symbol carried by the 2nd spatial stream to the 2nd OFDM symbol of the 4th space-time stream, map the opposite number of the conjugation of the 4th OFDM symbol carried by the 2nd spatial stream to the 3rd OFDM symbol of the 4th space-time stream, map the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, map the opposite number of the conjugation of the Mth OFDM symbol carried by the 2nd spatial stream to the (M−1)th OFDM symbol of the 4th space-time stream and map the conjugation of the (M−1)th OFDM symbol carried by the 2nd spatial stream to the Mth OFDM symbol of the 4th space-time stream, to obtain the 4th space-time stream;

map M OFDM symbols carried by the 3rd spatial stream, according to an original order of the OFDM symbols, to M OFDM symbols of the 5th space-time stream successively; map the opposite number of the conjugation of the 2nd OFDM symbol carried by the 3rd spatial stream to the 1st OFDM symbol of the 6th space-time stream, map the conjugation of the 1st OFDM symbol carried by the 3rd spatial stream to the 2nd OFDM symbol of the 6th space-time stream, map the opposite number of the conjugation of the 4th OFDM symbol carried by the 3rd spatial stream to the 3rd OFDM symbol of the 6th space-time stream, map the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, map the opposite number of the conjugation of the Mth OFDM symbol carried by the 3rd spatial stream to the (M−1)th OFDM symbol of the 6th space-time stream and map the conjugation of the (M−1)th OFDM symbol carried by the 3rd spatial stream to the Mth OFDM symbol of the 6th space-time stream, to obtain the 6th space-time stream; and map M OFDM symbols carried by the 4th spatial stream, according to an original order of the OFDM symbols, to M OFDM symbols of the 7th space-time stream successively; map the opposite number of the conjugation of the 2nd OFDM symbol carried by the 4th spatial stream to the 1st OFDM symbol of the 8th space-time stream, map the conjugation of the 1st OFDM symbol carried by the 4th spatial stream to the 2nd OFDM symbol of the 8th space-time stream, map the opposite number of the conjugation of the 4th OFDM symbol carried by the 4th spatial stream to the 3rd OFDM symbol of the 8th space-time stream, map the conjugation of the 3rd OFDM symbol carried by the 4th spatial stream to the 4th OFDM symbol of the 8th space-time stream, and according to a two-by-two crossover operation method for M OFDM symbols of the 4th spatial stream, map the opposite number of the conjugation of the Mth OFDM symbol carried by the 4th spatial stream to the (M−1)th OFDM symbol of the 8th space-time stream and map the conjugation of the (M−1)th OFDM symbol carried by the 4th spatial stream to the Mth OFDM symbol of the 8th space-time stream, to obtain the 8th space-time stream.

5. The device according to claim 4, wherein the first mapping module is further configured to map M OFDM symbols carried by the nth spatial stream, according to an arrangement order of the M OFDM symbols in the nth spatial stream, to M OFDM symbols of the (2n−1)th space-time stream successively, wherein the first mapping module is further configured to map the opposite number of the conjugation of the 2mth OFDM symbol carried by the nth spatial stream to the (2m−1)th OFDM symbol of the 2nth space-time stream; and map the conjugation of the (2m−1)th OFDM symbol carried by the nth spatial stream to the 2mth OFDM symbol of the 2nth space-time stream, wherein m=1, 2, . . . , M/2.

6. A device for transmitting data, comprising:
a second determination module, configured to determine to adopt space-time encoding; and a third mapping module, configured to map M orthogonal frequency division multiplexing (OFDM) symbols carried by nth spatial stream to OFDM symbols carried by (2n−1)th space-time stream and OFDM symbols carried by 2nth space-time stream respectively, wherein n=1, 2, . . . , N, N is a total number of spatial streams in the network, M is the number of OFDM symbols carried by each spatial stream, and M is an even number greater than zero; wherein when the number of the spatial streams in the network is 3, M OFDM symbols carried by each of the 3 spatial streams are respectively mapped to 6 space-time streams; when the number of the spatial streams in the network is 4, M OFDM symbols carried by each of the 4 spatial streams are respectively mapped to 8 space-time streams; and a data transmission module, configured to transmit data using the OFDM symbols carried by the (2n−1)th space-time stream and the OFDM symbols carried by the 2nth space-time stream which are obtained by the mapping;

wherein when the number N of the spatial streams in the network is 3, respectively mapping the M OFDM symbols carried by each of the 3 spatial streams to 6 space-time streams comprises:

mapping M OFDM symbols carried by the 1st spatial stream, according to an original order of the OFDM symbols, to M OFDM symbols of the 1st space-time stream successively;

mapping the opposite number of the conjugation of the 2nd OFDM symbol carried by the 1st spatial stream to the 1st OFDM symbol of the 2nd space-time stream, mapping the conjugation of the 1st OFDM symbol carried by the 1st spatial stream to the 2nd OFDM symbol of the 2nd space-time stream, mapping the opposite number of the conjugation of the 4th OFDM symbol carried by the 1st spatial stream to the 3rd OFDM symbol of the 2nd space-time stream, mapping the conjugation of the 3rd OFDM symbol carried by the 1st spatial stream to the 4th OFDM symbol of the 2nd space-time stream, and according to a two-by-two crossover operation method for M OFDM symbols of the 1st spatial stream, mapping the opposite number of the conjugation of the Mth OFDM symbol carried by the 1st spatial stream to the (M−1)th OFDM symbol of the 2nd space-time stream and mapping the conjugation of the (M−1)th OFDM symbol carried by the 1st spatial stream to the Mth OFDM symbol of the 2nd space-time stream, to obtain the 2nd space-time stream;

mapping M OFDM symbols carried by the 2nd spatial stream, according to an original order of the OFDM symbols, to M OFDM symbols of the 3rd space-time stream successively;

mapping the opposite number of the conjugation of the 2nd OFDM symbol carried by the 2nd spatial stream to the 1st OFDM symbol of the 4th space-time stream, mapping the conjugation of the 1st OFDM symbol carried by the 2nd spatial stream to the 2nd OFDM symbol of the 4th space-time stream, mapping the opposite number of the conjugation of the 4th OFDM symbol carried by the 2nd spatial stream to the 3rd OFDM symbol of the 4th space-time stream, mapping the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, mapping the opposite number of the conjugation of the Mth OFDM symbol carried by the 2nd spatial stream to the (M−1)th OFDM symbol of the 4th space-time stream and mapping the conjugation of the (M−1)th OFDM symbol carried by the 2nd spatial stream to the Mth OFDM symbol of the 4th space-time stream, to obtain the 4th space-time stream;

mapping M OFDM symbols carried by the 3rd spatial stream, according to an original order of the OFDM symbols, to M OFDM symbols of the 5th space-time stream successively; and mapping the opposite number of the conjugation of the 2nd OFDM symbol carried by the 3rd spatial stream to the 1st OFDM symbol of the 6th space-time stream, mapping the conjugation of the 1st OFDM symbol carried by the 3rd spatial stream to the 2nd OFDM symbol of the 6th space-time stream, mapping the opposite number of the conjugation of the 4th OFDM symbol carried by the 3rd spatial stream to the 3rd OFDM symbol of the 6th space-time stream, mapping the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, mapping the opposite number of the conjugation of the Mth OFDM symbol carried by the 3rd spatial stream to the (M−1)th OFDM symbol of the 6th space-time stream and mapping the conjugation of the (M−1)th OFDM symbol carried by the 3rd spatial stream to the Mth OFDM symbol of the 6th space-time stream, to obtain the 6th space-time stream;

wherein when the number N of the spatial streams in the network is 4, respectively mapping the M OFDM symbols carried by each of the 4 spatial streams to 8 space-time streams comprises:

mapping M OFDM symbols carried by the 1st spatial stream, according to an original order of the OFDM symbols, to M OFDM symbols of the 1st space-time stream successively;

mapping the opposite number of the conjugation of the 2nd OFDM symbol carried by the 1st spatial stream to the 1st OFDM symbol of the 2nd space-time stream, mapping the conjugation of the 1st OFDM symbol carried by the 1st spatial stream to the 2nd OFDM symbol of the 2nd space-time stream, mapping the opposite number of the conjugation of the 4th OFDM symbol carried by the 1st spatial stream to the 3rd OFDM symbol of the 2nd space-time stream, mapping the conjugation of the 3rd OFDM symbol carried by the 1st spatial stream to the 4th OFDM symbol of the 2nd space-time stream, and according to a two-by-two crossover operation method for M OFDM symbols of the 1st spatial stream, mapping the opposite number of the conjugation of the Mth OFDM symbol carried by the 1st spatial stream to the (M−1)th OFDM symbol of the 2nd space-time stream and mapping the conjugation of the (M−1)th OFDM symbol carried by the 1st spatial stream to the Mth OFDM symbol of the 2nd space-time stream, to obtain the 2nd space-time stream;

mapping M OFDM symbols carried by the 2nd spatial stream, according to an original order of the OFDM symbols, to M OFDM symbols of the 3rd space-time stream successively;

mapping the opposite number of the conjugation of the 2nd OFDM symbol carried by the 2nd spatial stream to the 1st OFDM symbol of the 4th space-time stream, mapping the conjugation of the 1st OFDM symbol carried by the 2nd spatial stream to the 2nd OFDM symbol of the 4th space-time stream, mapping the opposite number of the conjugation of the 4th OFDM symbol carried by the 2nd spatial stream to the 3rd OFDM symbol of the 4th space-time stream, mapping the conjugation of the 3rd OFDM symbol carried by the 2nd spatial stream to the 4th OFDM symbol of the 4th space-time stream, and according to a two-by-two crossover operation method for M OFDM symbols of the 2nd spatial stream, mapping the opposite number of the conjugation of the Mth OFDM symbol carried by the 2nd spatial stream to the (M−1)th OFDM symbol of the 4th space-time stream and mapping the conjugation of the (M−1)th OFDM symbol carried by the 2nd spatial stream to the Mth OFDM symbol of the 4th space-time stream, to obtain the 4th space-time stream;

mapping M OFDM symbols carried by the 3rd spatial stream, according to an original order of the OFDM symbols, to M OFDM symbols of the 5th space-time stream successively;

mapping the opposite number of the conjugation of the 2nd OFDM symbol carried by the 3rd spatial stream to the 1st OFDM symbol of the 6th space-time stream, mapping the conjugation of the 1st OFDM symbol carried by the 3rd spatial stream to the 2nd OFDM symbol of the 6th space-time stream, mapping the opposite number of the conjugation of the 4th OFDM symbol carried by the 3rd spatial stream to the 3rd OFDM symbol of the 6th space-time stream, mapping the conjugation of the 3rd OFDM symbol carried by the 3rd spatial stream to the 4th OFDM symbol of the 6th space-time stream, and according to a two-by-two crossover operation method for M OFDM symbols of the 3rd spatial stream, mapping the opposite number of the conjugation of the Mth OFDM symbol carried by the 3rd spatial stream to the (M−1)th OFDM symbol of the 6th space-time stream and mapping the conjugation of the (M−1)th OFDM symbol carried by the 3rd spatial stream to the Mth OFDM symbol of the 6th space-time stream, to obtain the 6th space-time stream;

mapping M OFDM symbols carried by the 4th spatial stream, according to an original order of the OFDM symbols, to M OFDM symbols of the 7th space-time stream successively; and mapping the opposite number of the conjugation of the 2nd OFDM symbol carried by the 4th spatial stream to the 1st OFDM symbol of the 8th space-time stream, mapping the conjugation of the 1st OFDM symbol carried by the 4th spatial stream to the 2nd OFDM symbol of the 8th space-time stream, mapping the opposite number of the conjugation of the 4th OFDM symbol carried by the 4th spatial stream to the 3rd OFDM symbol of the 8th space-time stream, mapping the conjugation of the 3rd OFDM symbol carried by the 4th spatial stream to the 4th OFDM symbol of the 8th space-time stream, and according to a two-by-two crossover operation method for M OFDM symbols of the 4th spatial stream, mapping the opposite number of the conjugation of the Mth OFDM symbol carried by the 4th spatial stream to the (M−1)th OFDM symbol of the 8th space-time stream and mapping the conjugation of the (M−1)th OFDM symbol carried by the 4th spatial stream to the Mth OFDM symbol of the 8th space-time stream, to obtain the 8th space-time stream.

* * * * *